United States Patent [19]

Onishi

[11] Patent Number: 4,757,185
[45] Date of Patent: Jul. 12, 1988

[54] AUTOMATIC CASH TRANSACTION APPARATUS

[75] Inventor: Yoshiyuki Onishi, Seto, Japan

[73] Assignee: Hitachi, Ltd., Tokyo, Japan

[21] Appl. No.: 42,702

[22] Filed: Apr. 27, 1987

[30] Foreign Application Priority Data

Apr. 28, 1986 [JP] Japan .................................. 61-96715

[51] Int. Cl.⁴ .............................................. G06K 5/00
[52] U.S. Cl. ..................................... 235/379; 235/380
[58] Field of Search ........................................ 235/379

[56] References Cited

U.S. PATENT DOCUMENTS 4,298,793 11/1981 Melis .................................. 235/380

Primary Examiner—Harold I. Pitts
Attorney, Agent, or Firm—Antonelli, Terry & Wands

[57] ABSTRACT

An automatic cash transaction apparatus includes a circuit for performing signal reception and transmission with a card carried by a user through the medium of electromagnetic wave. When a number set in the card and received by the apparatus is authorized one, the user is allowed to input the type of transaction desired by the user, cipher number and other data as required through key manipulation, whereby the manual handling of the card is made unnecessary.

5 Claims, 2 Drawing Sheets

AUTOMATIC CASH TRANSACTION APPARATUS

BACKGROUND OF THE INVENTION

The present invention relates to an automatic cash transaction apparatus for performing transactions such as deposit and payment of cash money in banking organs.

In the hitherto known automatic cash transaction apparatus used in banking organs, the customer is required to load a magnetic card into a card inserting slot provided in the apparatus, wherein inputting of the data concerning the type of transaction desired by the user and the cipher number allocated to the user is allowed through key manipulation after the information recorded in a magnetic stripe of the card has been read out and processed appropriately. Reference may be made, for example, to Japanese Patent Application Laid-Open No. 4641/1980 (JP-A-55-4641).

Insertion of the magnetic card into the card insertion slot which is required as the prerequisite for the transaction in the hitherto known apparatus means a burden imposed on the user, to a disadvantage. Further, deformation or injury of the magnetic card may possibly give rise to a problem that the transaction is inhibited due to failure in reading out the information.

Another problem can be seen in the fact that the magnetic card might be left and forgotten in the apparatus.

SUMMARY OF THE INVENTION

In view of the state of the art, it is an object of the present invention to provide an automatic cash transaction apparatus which is essentially immune to the problems of the prior art apparatus mentioned above and which allows a customer to carry out the desired transaction only through key manipulation with the card being placed within his or her pocket to thereby reduce the burden posed on the customer while preventing the apparatus from failure due to deformation and/or injury of the card and eliminating the trouble of the card being possibly left and forgotten.

The above object can be accomplished according to the present invention by providing an automatic cash transaction apparatus which comprises means for performing signal transmission/reception with the card carried by the user.

More specifically, in the automatic cash transaction apparatus according to the invention, a request signal is sent out to the card which responds thereto for sending out a first identification information. When the first identification information is confirmed to be proper by the automatic cash transaction apparatus, the user is then allowed to input data concerning the cipher number and the type of the desired transaction through key manipulation on a manipulation panel of the apparatus. Subsequently, the automatic cash transaction apparatus sends out again a request signal to the card. Upon reception of this request signal, the card sends out the second identification signal placed in the card. The automatic cash transaction compares the second identification information received from the card with the cipher number inputted through manipulation of the relevent keys. Only when a predetermined relation is found between the second identification number and the cipher number, operation for transaction such as deposit and payment of cash money and others is permitted to be carried out.

DESCRIPTION OF THE PREFERRED EMBODIMENTS

Figure 1:
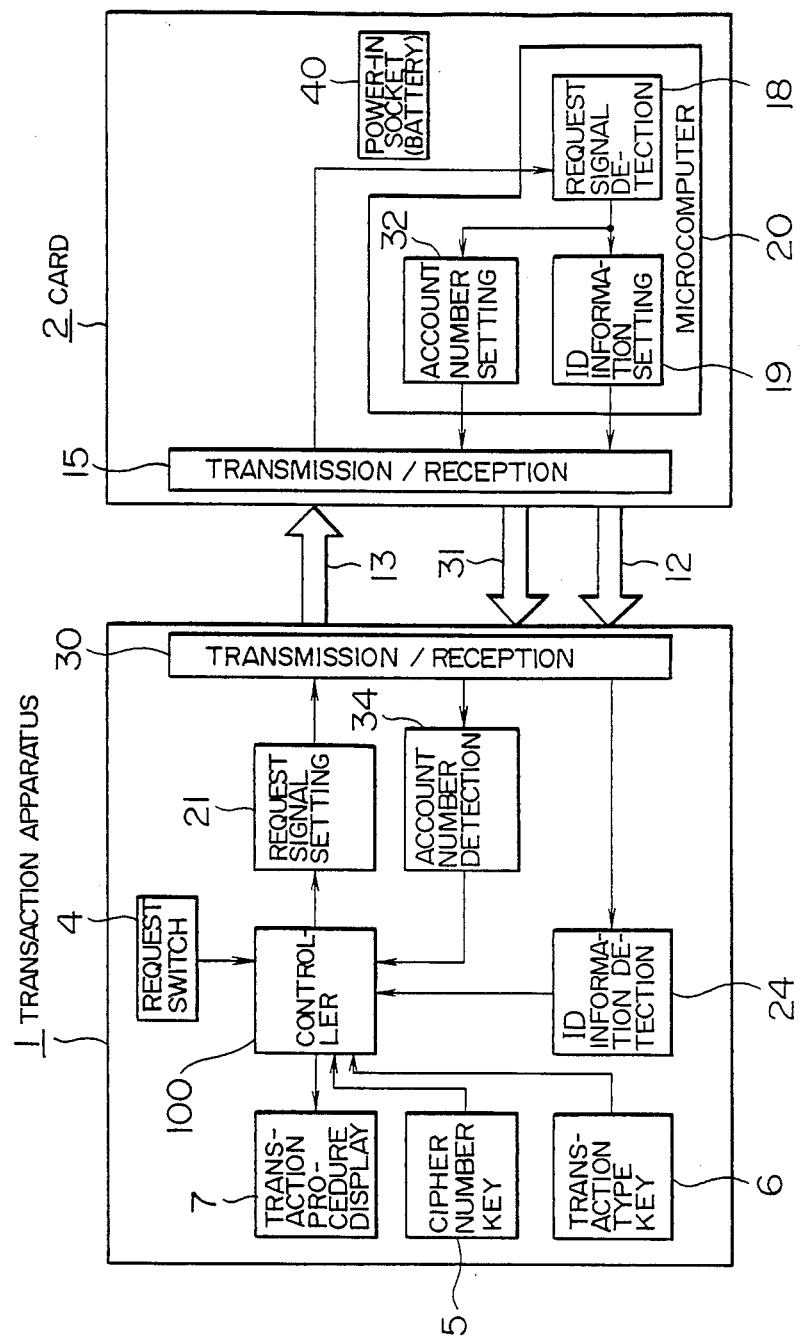
FIG. 1 is a functional block diagram showing a general arrangement of an automatic cash transaction appratus according to an embodiment of the present invention.

In the following, the present invention will be described in detail in conjunction with an exemplary embodiment thereof by referring to the drawings.

Figure 2:
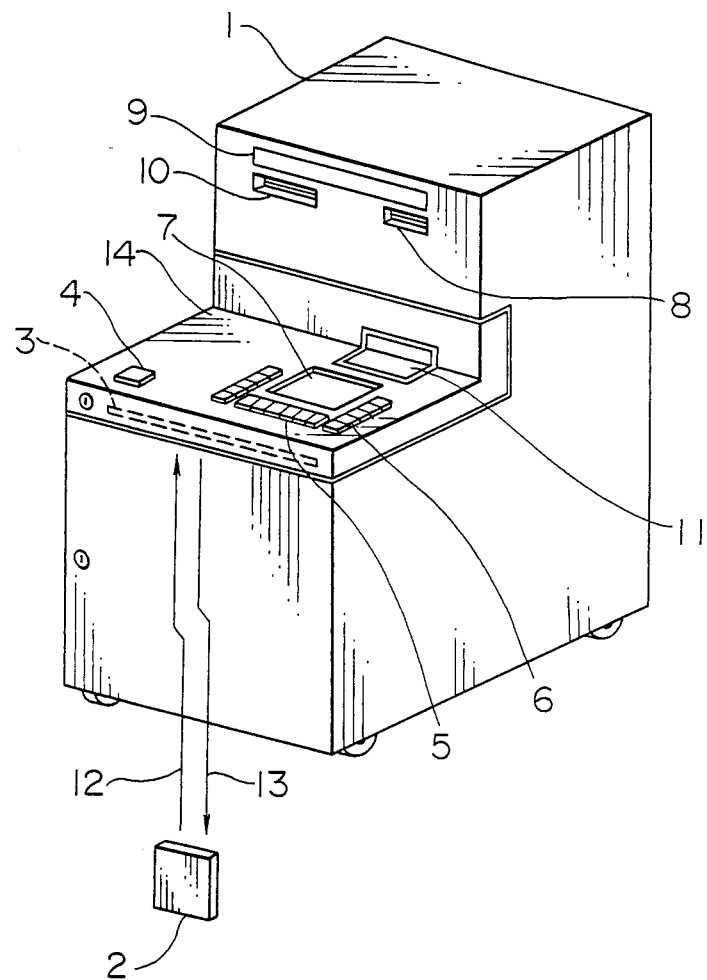
FIG. 2 is a perspective view of the automatic cash transaction apparatus according to an embodiment of the invention.

FIG. 2 is a perspective view showing an automatic cash transaction apparatus according to an embodiment of the invention.

In the Figure, a reference numeral 1 generally denotes an automatic cash transaction apparatus, 2 denotes a battery-operated card (e.g. IC card), 3 denotes an antenna provided on the side of the automatic cash transaction apparatus (referred to as the apparatus antenna), 4 denotes a request switch, 5 denotes a cipher number key array, 6 denotes a transaction type selecting key array, 7 denotes a transaction procedure display unit, 8 denotes a delivery port of a specification sheet recording the results of the transaction as performed, 9 denotes a state and operation mode display unit, 10 denotes an insert slot for a bankbook, and a numeral 11 denotes a paper money insert/delivery slot. Further, a numeral 12 designates an identification information signal, 13 designates a request signal, and 14 denotes a manipulation panel.

The apparatus antenna 3 is disposed on the front side within the automatic cash transaction apparatus 1. The request switch 4 for activating the transmission of a request signal 13, the cipher number key array 5 for allowing a customer to start the transaction or interaction with the apparatus 1, the transaction type selecting key array 6 and the like and the transaction procedure display unit 7 for indicating the transaction procedure to the customer are disposed on the manipulation panel 14. Further, there are provided on the manipulation panel 14 on the bankbook insertion slot 10 for inserting a bankbook the paper money insert/delivery slot 11 for allowing deposit/payment with cash money, the specification slip delivery port 8 issuing a specification slip recording the contents of the transaction, and the state-/operation mode display 9 for indicating the state of the automatic cash transaction apparatus 1 and the type of transaction allowed for the customer.

Referring to FIG. 1, a reference numeral 1 generally denotes the automatic cash transaction apparatus shown in FIG. 2, and a numeral 100 denotes a controller for controlling operations performed in the automatic cash transaction apparatus 1. A reference numeral 21 denotes a request signal setting circuit in which a request signal is set. A numeral 30 denotes a transmission/reception circuit for transmitting and receiving the request signal 13, the account number signal 31 and the identification information signal 12 to and from the card through the medium of electromagnetic wave. A numeral 24 denotes an identification (ID) information detecting circuit for detecting the identification information signal 12. A reference numeral 2 denotes generally a card used by the customer which includes a power supply cell (battery) 40 for supplying electric power to internal circuits, a transmission/reception circuit 15 for transmitting and receiving the request signal 13, the account number signal 31 and the identification information signal 12 to and from the external apparatus through the medium of an electromagnetic wave, a request signal detecting circuit 18 for detecting the request signal 13, an account number setting circuit 32 in which the account number is placed and an identification (ID) information setting circuit 19 in which the identification information is placed. The account number setting circuit 32, the identification (ID) information setting circuit 19 and the request signal detecting circuit 18 are realized by a microcomputer denoted generally by a reference numeral 20.

Now, operation of the apparatus shown in FIGS. 1 and 2 will be described.

When a customer carrying the card 2 in his or her pocket depresses the request switch 4, the controller 100 reads out data from the request signal setting circuit 21 to cause a first request signal 13 to be sent out through the transmission/reception circuit 30 and the apparatus antenna 3 energized by the transmission/-reception circuit 30. The transmission/reception circuit 15 incorporated in the card 2 which is normally in a reception state receives the first request signal 13 and supplies that signal 13 to the microcomputer 20. When the first request signal 13 is detected by the request signal detecting circuit 18 included in the microcomputer 20, first identification information is read out from the identification information setting circuit 19 to be supplied to the transmission/reception circuit 15 of the card 2. The first identification information signal 12 thus sent out from the transmission/reception circuit 15 of the card 2 is received by the transmission/reception circuit 30 of the automatic cash transaction apparatus 1. The first identification information thus received is detected by the identification information detecting circuit 24 to be subsequently sent to the controller 100. When the controller 100 decides that the first identification information is proper or valid, the controller 100 allows manipulation of the transaction type selecting key array or field 6 and the cipher number key array 5. In other words, the controller 100 handles the data which will be subsequently inputted through manipulation of the transaction thpe selecting key 6 and the cipher number keys 5 or the like as the valid data. Simultaneously with the permission of the data inputting through the key operation, the transaction procedure display unit 7 displays the transaction procedure. At this time point, the customer is allowed to input the transaction type, the cipher number (e.g. personal identification number) and other data through operation of the relevant keys on the manipulation panel 14. At the same time, the controller 100 reads out the data from the request signal setting circuit 21 to cause the transmission/reception circuit 30 to send out a second request signal 13. When this second request signal 13 is detected by the request signal detecting circuit 18 of the card 2 in the manner similar to the case of the first request signal, the identification setting circuit 19 and the account number setting circuit 32 send out the second identification signal 12 and the account number signal 31, through the transmission/reception circuit 15 of the card 2, respectively. Upon reception of the second identification information signal 12 and the account number signal 31 by the transmission/reception circuit 30 provided on the side of the automatic cash transaction apparatus 1, the second identification information is detected by the identification information detecting circuit 24 to be supplied to the controller 100 as in the case of the first identification information signal. On the other hand, the account number signal 31 is detected by the account number detecting circuit 34, and the detected account number is also supplied to the controller 100. The controller 100 then compares the second identification information with the cipher number inputted through operation of the cipher number keys 5 by the customer. When coincidence results from the above comparison, operation for the transaction selected by the manipulation of the transaction type selecting keys 6 such as, for example, deposit or payment or the like is admitted. The subsequent transaction sequence can proceed with by using the account number received from the card. On the other hand, when the aforementioned comparison results in discrepancy or inequality, operation for the current transaction is inhibited.

In the foregoing description, the request signal setting circuit 21 may be constituted by a memory for storing the first and second request signals which are read out under the command issued by the controller 100. The first and second request signals are added with different codes at the respective leading ends so that the request signal detecting circuit 18 may discriminatively identify the first and second request signals on the basis of the difference between the code information. For discriminating the account number and the identification information on the side of the automatic cash transaction apparatus, different code information may be added to the account number and the first and second identification information at the leading ends, respectively.

It should further be noted that the first identification information may be of the same content for the cards possessed by all the customers. Thus, the controller 100 can decides whether the first identification information is proper or not by checking whether the first identification is identical with the abovementioned content.

The identification information setting circuit 19 may be constituted by a memory destined for storing the first and second identification information, wherein the first identification information is read out in response to the first request signal output produced by the request signal detecting circuit 18, while the second identification information is read out upon detection of the second request signal. The account number setting circuit 32 also reads out the account number from the memory in response to the second request signal detection output, as in the case of the identification information setting circuit 19. The identification information setting circuit 19 and the account number setting circuit 32 may be implemented in one and the same memory and allocated with different addresses, respectively.

The transmission/reception circuit 30 of the automatic cash transaction apparatus 1 includes an antenna denoted by a reference numeral 3 in FIG. 2. Similarly, the transaction/reception circuit 15 of the card 2 includes antenna which may have a transmission/reception mode switching circuit as in the circuit 30. The technique of performing signal transmission and reception with an external apparatus by providing an antenna in a carrier such as a card is disclosed, for example, in Japanese Patent Application Laid-Open No. 151572/1983 (JP-A-58-151572). Additionally, the techniques of actuating the circuits incorporated in a carrier such as a card which is placed in the field in which energy or power source is present have been heretofore known. By way of example, reference may be made to Japanese Patent Application Laid-Open Nos. 151572/1983, 151723/1983, 154080/1983 and others. Accordingly, when the automatic cash transaction apparatus is so structured as to form the field of energy, the power supply cell 40 incorporated in the card 2 may be omitted.

Additionally, the request switch 4 may be replaced by means for optically sensing the approaching of the user to the apparatus, means for detecting the weight of the user standing in front of the apparatus or the like appropriate means.

With the arrangement described in the foregoing, before the identification information to be compared with the ciper number inputted through key operation on the panel is sent out, another identification information is transmitted from the card through the same circuit system. Thus, the operation for inputting the cipher number can be performed after having confirmed the normal operation of the circuits incorporated in the card. Thus, the discrepancy upon checking the cipher number due to fault of the circuits incorporated in the card can be prevented. This feature is advantageous in such a system that when the number of discrepancies appearing at the cipher number check step has attained a predetermined value, the card is invalidated, because unwanted increasing in the number of times the discrepancy makes appearance can be prevented.

Further, it should be mentioned that the automatic cash transaction apparatus as a whole should be installed in the electromagnetcially shielded space in which only one person is admitted, for the purpose of preverting the automatic cash transaction apparatus from making access to a plurality of the cards simultaneously at one time.

The present invention provides various advantages such as mentioned below.

(1) Since the customer can carry out the transaction only through the key manipulation with the card being left as placed in a pocket or bag, the burden posed on the customer can be significantly reduced.

(2) Since the card need not be actually inserted into the apparatus, failures due to deformation and injury of the card can be positively prevented, whereby the reliability of the system can be improved.

(3) Because the card need not be inserted in the apparatus, the time otherwise required for taking out the card and placing it to the apparatus is reduced down to zero, whereby transaction can be carried out with high efficiency.

(4) Since the customer is not required to insert the apparatus, there can be avoided such trouble that the card is left and forgotten.

(5) Since the magnetic card employed conventionally in the prior art system is not used in the system according to the invention, no card reader is required which in turn means that the apparatus can be realized inexpensively with improved reliability.

What is claimed is:

1. An automatic cash transaction apparatus equipped with manipulation means to be manipulated by customers in carrying out transaction such as deposit and payment of cash money, inquiry of the balance and registration in a bankbook, comprising:

transmission/reception means for performing signal transmission and reception with a card carried by a customer through a medium of an electromagnetic wave;

means for transmitting a first request signal to said card through said transmission/reception means;

detecting means for detecting first identification information transmitted from said card through said transmission reception means in response to said first request signal;

decision means for deciding whether said first identification information detected by said detecting means is proper or not;

input enabling means for permitting an inputting operation with said manipulating means when said first identification information has been decided to be proper by said decision means;

means for transmitting a second request signal to said card through said transmission/reception means when said first identification information has been decided to be proper by said decision means;

detecting means for detecting second identification information transmitted from said card through said transmission/reception means in response to said second request signal;

comparison means for comparing said second identification information with a cipher number inputted through said manipulating means; and means for permitting an operation for the transaction only when said second identification information and said cipher number compared by said comparison means are in a predetermined relationship.

2. An automatic cash transaction apparatus according to claim 1, wherein said first request signal transmitting means is activated by a switch provided in said manipulation means 3. An automatic cash transaction apparatus according to claim 1, wherein said first request transmitting means is activated in response to a user detection output signal produced by a user's detector.

4. An automatic cash transaction apparatus according to claim 1, wherein the automatic cash transaction apparatus as a whole is installed in an electromagnetically shielded space to allow interaction of the user with the apparatus in the shielded space.

5. An automatic cash transaction apparatus according to claim 1, wherein in the transaction operation permitted by said transaction operation permitting means, an account number is used which is transmitted from said card through said transmission/reception means in response to said second request signal.

* * * * *